US00RE37261E

(19) United States
(12) Reissued Patent
Schmider et al.

(10) Patent Number: US RE37,261 E
(45) Date of Reissued Patent: Jul. 3, 2001

(54) AXIALLY COMPACT SMALL FAN

(75) Inventors: Fritz Schmider, Hornberg; Edgar Zuckschwert, St. Georgen, both of (DE)

(73) Assignee: Papst Licensing GmbH & Co. KG (DE)

( * ) Notice: This patent issued on a continued prosecution application filed under 37 CFR 1.53(d), and is subject to the twenty year patent term provisions of 35 U.S.C. 154(a)(2).

(21) Appl. No.: 08/369,848

(22) Filed: Jan. 5, 1995

Related U.S. Patent Documents

Reissue of:
(64) Patent No.: 5,176,509
Issued: Jan. 5, 1993
Appl. No.: 07/659,984
Filed: Feb. 22, 1991

(30) Foreign Application Priority Data

Aug. 22, 1990 (DE) ..... 9012087

(51) Int. Cl.[7] ..... F04B 17/04; F04B 35/04
(52) U.S. Cl. ..... 417/423.7; 417/423.1; 310/268; 310/DIG. 6
(58) Field of Search ..... 417/423.7, 423.1, 417/423.12, 423.2; 415/205; 310/DIG. 6, 268

(56) References Cited

U.S. PATENT DOCUMENTS 4,128,364 * 12/1978 Papst et al. ..... 415/206
4,513,812 4/1985 Papst et al. .
4,737,672 * 4/1988 Kazami ..... 310/DIG. 6 X
4,806,808 * 2/1989 Grecksch ..... 310/DIG. 6 X
4,861,237 * 8/1989 Shiraki et al.r ..... 417/423.7
4,891,537 * 1/1990 Shiraki et al. ..... 310/DIG. 6 X
4,955,791 * 9/1990 Wrobel ..... 417/423.12
4,961,017 * 10/1990 Kakinoki et al. ..... 312/DIG. 6 X
5,028,216 * 7/1991 Harmsen et al. ..... 417/423.7
5,045,740 * 9/1991 Hishinuma ..... 310/DIG. 6 X
5,049,770 * 9/1991 Gaeth et al. ..... 417/423.14

FOREIGN PATENT DOCUMENTS

8702271 * 6/1987 (DE) .
87149885 U 11/1987 (DE) .
383867A1 11/1988 (DE) .

* cited by examiner

*Primary Examiner*—Charles G. Freay
(74) *Attorney, Agent, or Firm*—Welsh & Katz, Ltd.

(57) ABSTRACT

A flat portable fan with an impeller on a motor shaft and a commutatorless direct current motor is provided having a printed circuit board in the stator and an axially magnetized permanent magnet in the rotor. The circuit board comprises a printed circuit having electronic components of the fan drive and is made from an iron base material with an insulating layer, which carries the stator windings and an axial starting bearing for the rotor. The impeller is mounted in a cylindrical rotor mounting support and is driven by the axially magnetized permanent magnet. The iron base material and the permanent magnet substantially define a planar air gap.

19 Claims, 5 Drawing Sheets

AXIALLY COMPACT SMALL FAN

Matter enclosed in heavy brackets [ ] appears in the original patent but forms no part of this reissue specification; matter printed in italics indicates the additions made by reissue.

The invention relates to a flat or shallow constructed small or portable fan with an impeller or fan wheel on a motor shaft and with a commutatorless direct current (d.c.) motor as the drive. The said direct current motor has only one coil on a circuit board in the stator. The rotor has an axially magnetized permanent magnet.

Such fans are known from De-OS 38 38 367 and German Utility models G 87 02 271 and G 87 14 988.

The known fans are characterized by a relatively small volume. However, an even flatter fan construction is required for various applications, also in connection with measures for minimizing sound transmission from the fan to the environment.

The problem of the invention is to make such a fan more compact in the axial direction, while simultaneously reducing manufacturing costs.

According to the invention this problem is solved by a configuration of the fan drive and the fan in which the radially directed fan blades allow rotation to take place in both directions. The arrangement of the driving coil, driving electronics and magnetic yoke is kept axially compact through the use of a printed circuit board, and iron is used as the so-called base material. The overall height of the portable fan is less than 30 mm.

Further details, features and advantageous developments of the invention can be gathered from the non-limitative embodiment described hereinafter, the claims and the attached drawings, wherein:

FIGS. 1, 2 and 3 show the following details of the fan.

Figure 1:
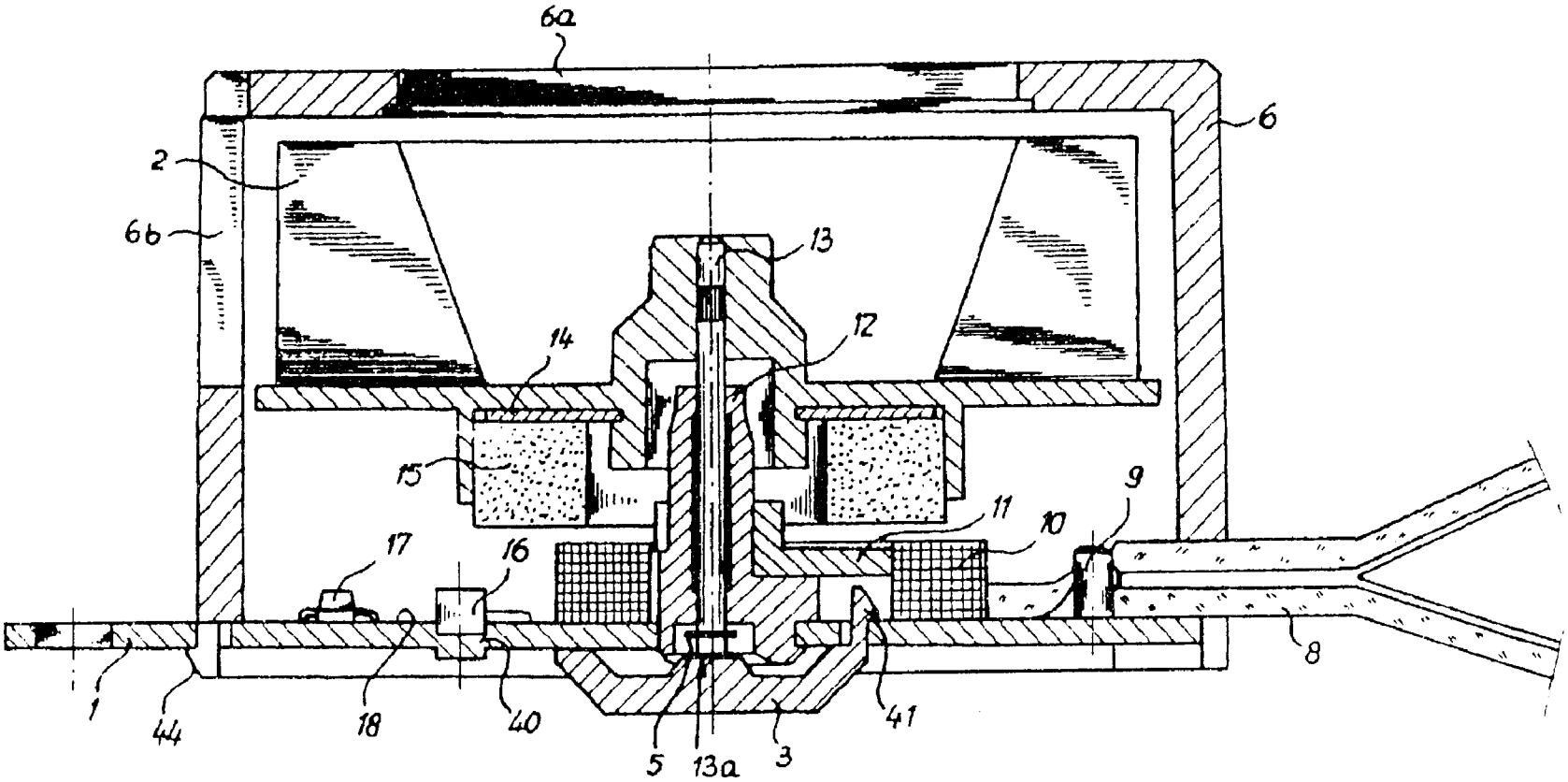
FIG. 1 is a cross-section through a portable fan with a commutatorless drive motor.

An impeller 2 is mounted on a shaft 13 and driven by a four-pole permanent magnet 15. Air is sucked in through an opening 6a in a casing 6 positioned above the shaft 13 and is blown out laterally via radially positioned opening 6b of the casing 6.

The casing can be fixed to a printed circuit board 1 with an inwardly or outwardly directed snap-action connection 43 (FIG. 2) or 44 (FIG. 1). The printed circuit board 1 is made from iron as the base material with a laminated insulating layer and printed or etched on conductors 18, which contact electric circuit components 17.

The printed circuit board 1 also has grooves or depressions 40 in which are located permanent magnets 16. When no current is applied to the drive motor a working permanent magnet 15 of the impeller 2 is brought into a clearly defined starting position by the field of the magnets 16.

The printed circuit board 1 also carries an oval or elliptical coil 10 which may be, for example, a bifilar winding or a monofilar winding with an open center tap. The coil wire ends are fixed to connection points 30, 31, 32, 34 (cf. FIG. 3). The coil 10 surrounds a bearing tube 12, which carries the shaft 13 and which is constructed, for example, [for example] as a sintered part or as a plastic moulding. The bearing tube 12 is additionally supported at a point spaced from the printed circuit board 1, by a supporting member 11, which is engaged by its terminal protuberances 21 in recesses 20 of the circuit board.

The impeller 2 is fixed by conventional technology to the shaft 13. The supporting member 11 has a centrally positioned opening 11a for receiving an upper, tubular portion 12a of the bearing tube 12. The member 11 also has widened feet 11b for engaging in planar manner on the circuit board 1. With its central opening the coil 10 can be placed accurately around the feet 11b of the supporting member 11. Recessed 23 positively allow an alignment of a foot 22 of the bearing tube 12 with respect to the printed circuit board 1.

Figure 3:
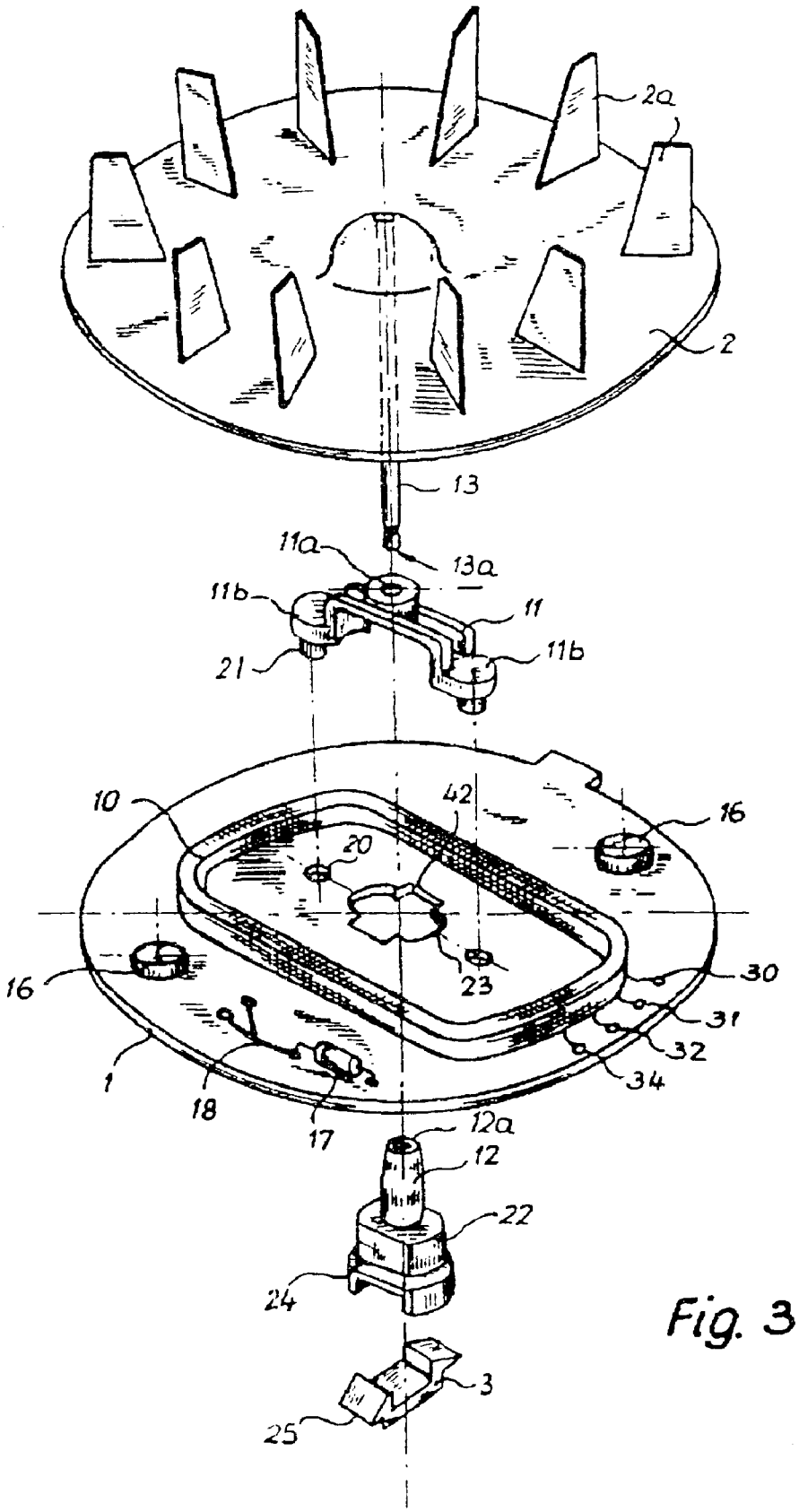
FIG. 3 is an exploded view better showing details of FIG. 2.

The shaft 13 of the impeller 2 mounted by the bearing tube 12 carries at the lower end an abutment ring 5, a retaining ring 4, and a track cap 13a of the shaft 13 runs on the bearing part 3, which substantially constantly absorbs the axially directed force caused by the working magnet 15 and the iron yoke of the circuit board 1. *The track cap 13a and the bearing part 3 form a starting bearing.* The bearing part 3 is preferably snapped in and has snap-action projections 41 or 25, which engage in recesses 42 (FIG. 3).

When current is applied to the coil 10 a magnetic field is formed, which has opposite polarity inside and outside the coil. As a result of the divergences from the circular shape of the coil 10, and as a function of the direction of the coil current, the working magnet 15 of the impeller 2 is positioned in such a way that its north pole surfaces point towards the south pole regions of the coil or vice versa. In order to improve the motor efficiency the four-pole, axially magnetized magnet 15 preferably has an iron yoke member 14.

The auxiliary magnets 16 are so positioned that on switching on there is a rotary movement of the impeller 2. Simultaneously the working magnet 15 induces a voltage in part of the coil 10, so that the coil current is interrupted by series-connected electronic circuits and the impeller 2 can continue to rotate freely.

After a certain time the phase position of the induced voltage is reversed, so that the electronic circuit again allows current to be applied to the coil and the impeller can rotate on. Thus, starting can take place in both rotation directions, so that the blades of the impeller 2 are radially positioned. The air speed is increased in each drive motor rotation direction and a uniform air flow is produced.

Figure 4:
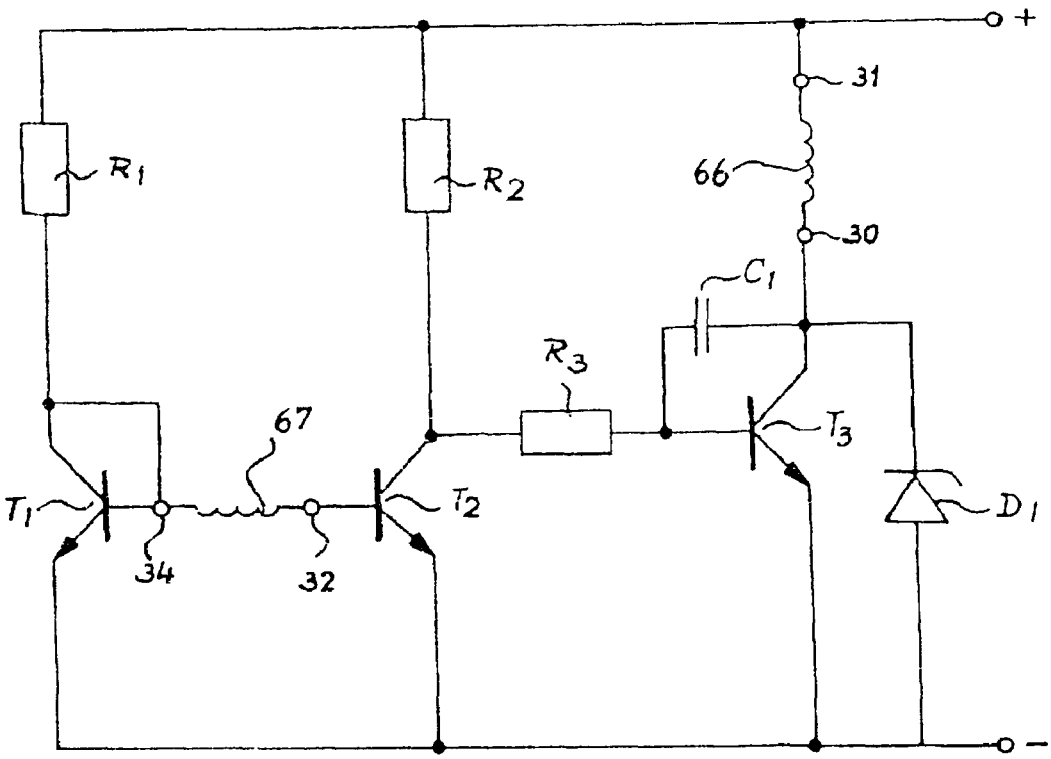
FIG. 4 is a circuit for operating the drive motor.

FIG. 4 shows details of the circuit. Across connection points 30 and 32, a transistor T3 supplies a supply voltage to part 66 of the coil 10. The voltage peaks occurring on switching off the said coil part 66, are reduced across a diode D1. A part 67 of the coil 10 produces in the aforementioned manner induced voltages, which are supplied across the connection point 32 to a transistor T2. At the appropriate time the transistor T2 opens or closes the transistor T3. Components T1, R1, R2 and R3, as well as C1 and the conventional components of the, to this extent known, circuit are to be connected with the contact points 30, 31, 32, 34 of the four coil wire ends. As a result of this circuit the noise produced when operating the fan is low.

Monofilar wound coils with a center tap can be used with other circuits. Such a circuit variant is easier to manufacture, but surprisingly leads to somewhat higher motor noise than the first-mentioned circuit variant.

The desired fan speed is adjusted by means of the resistor R3 and the capacitor C1.

The aforementioned switching elements, with the exception of the coils and the capacitor, can naturally all be combined in an integrated circuit (IC).

Figure 2:
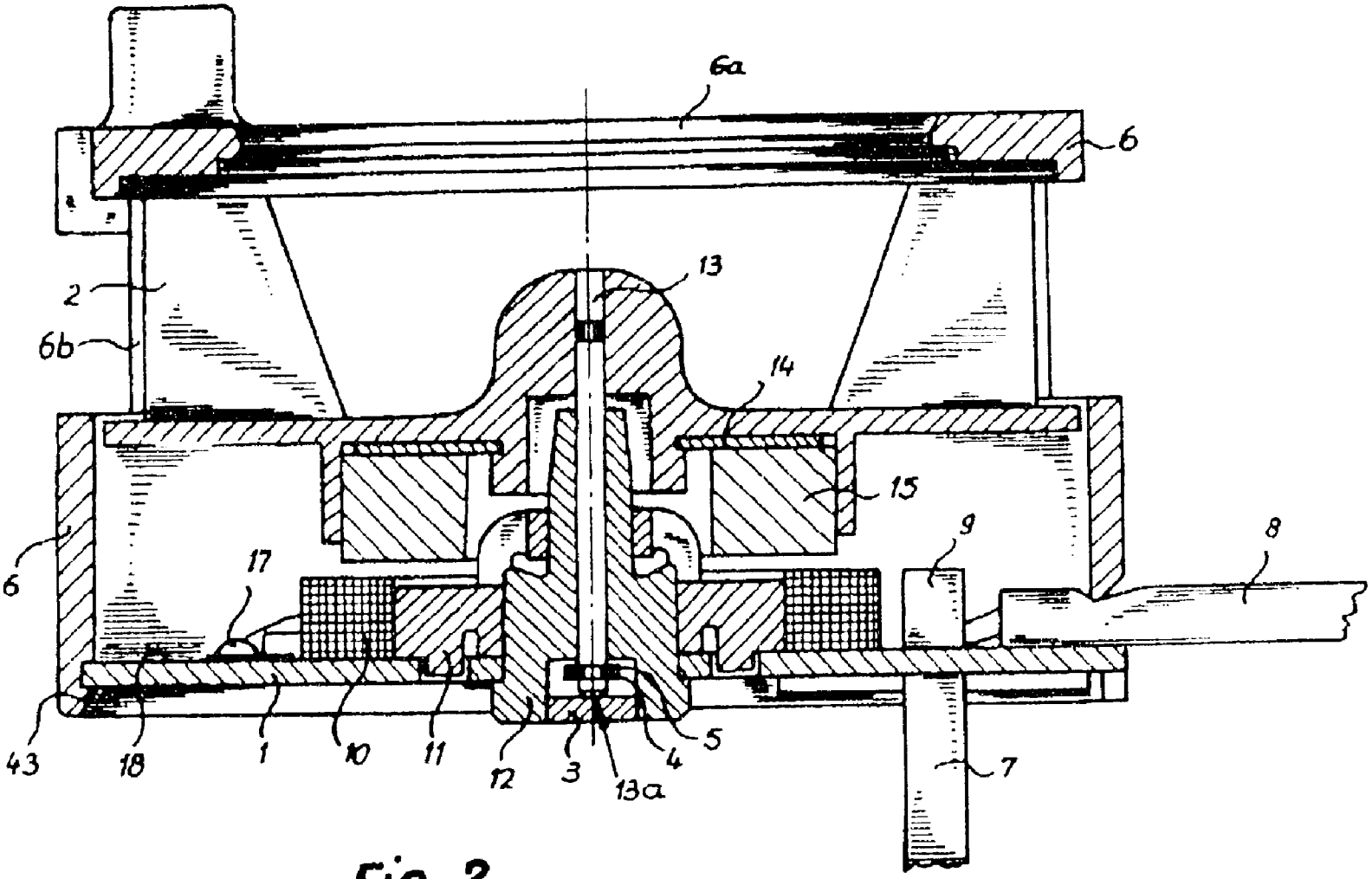
FIG. 2 is a sectional view displaced relative to FIG. 1.
Figure 5:
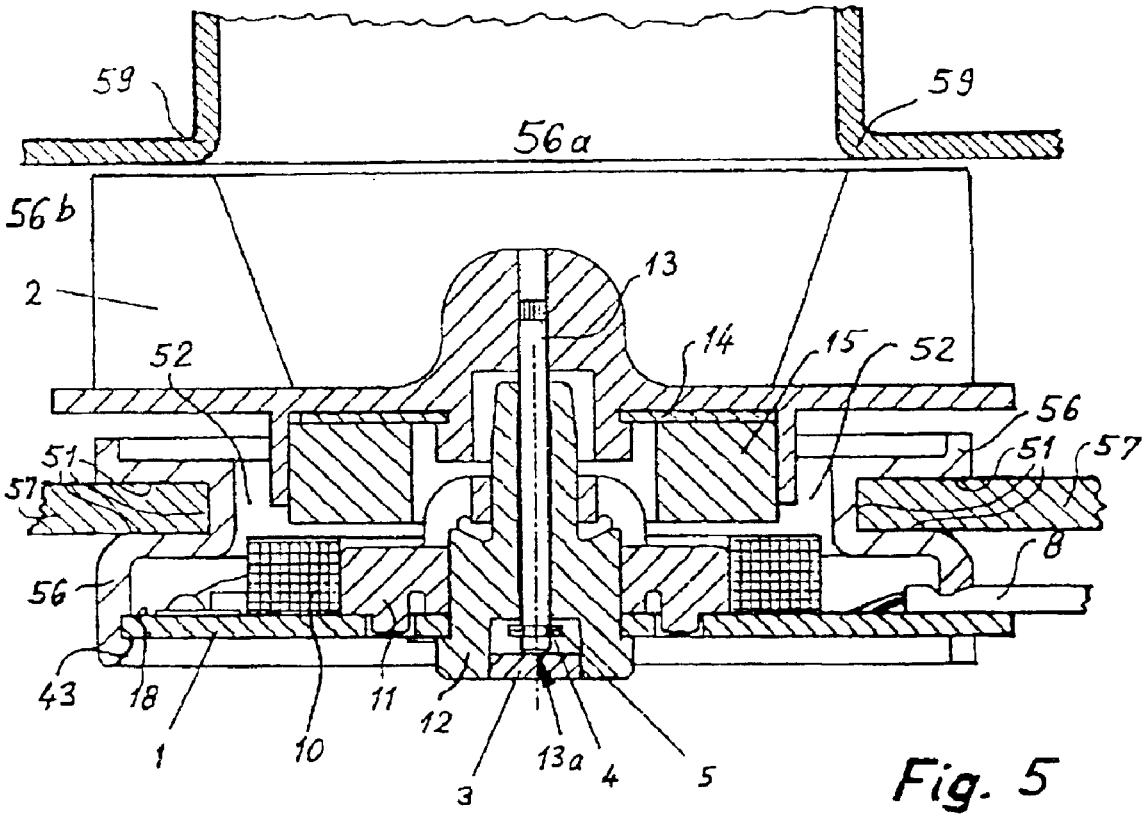
FIG. 5 is a sectional view of a fan, similar to that of FIG. 2 but with an alternative construction of the motor casing.

The blower according to FIG. 5 has essentially the same construction as that of FIG. 2. However, the external diameter of the casing 56 is reduced and preferably in the axial center of its outer jacket is provided a preferably all-round fastening slot 51, which projects radially inwards into a free space 52 of the motor. Thus, for the same motor size and power, the installation diameter can be reduced, in that the fan is fixed by being engaged on a U-shaped sheet metal wall 57, for example which engages positively in the slot 51. As in FIG. 2, the air is sucked in axially through the opening 56a, which can be given a differing configuration as a function of the intended use, while being radially blown out through the opening or openings 56b. The flow guide ring 6 in FIG. 2 can be mounted on the fan side therein, as can an element 59 secured on the apparatus to be ventilated.

On its circumferential outer face the casing 56 is provided with the slot 51 for a locking fastening in the apparatus to be ventilated. Corresponding projections can be provided on the casing 56 for a locking fastening.

Preferably an adhesive fluid is applied to the shaft 3 so as to prevent the wetting thereof by oil. Coating the shaft with this fluid ensures that the oil remains in the bearing area and no creep or expansion thereof into other areas takes place. A fluid of this type is also called an "epilaminating agent".

We claim:

1. Flat portable fan with an impeller on a motor shaft and a commutatorless direct current motor *including a stator, a rotor, and a fan drive having electronic control components, said motor* having a printed circuit board in the stator and having an axially magnetized permanent magnet in the rotor, the circuit board being made of an iron base material with an insulating layer thereon and comprising a printed circuit having *conductors which contact* the electronic components of the fan drive, [made from an iron base material with an insulating layer,] the circuit board carrying stator windings and an axial starting bearing for the rotor, the impeller being mounted in a cylindrical rotor mounting support and being driven by the axially magnetized permanent magnet, and the iron base material and the permanent magnet substantially defining a planar air gap.

2. Flat portable fan comprising:

a commutatorless direct current drive motor having a motor shaft, a stator, and electronic control components;

an air impeller rotor structure mounted directly on the motor shaft, the structure providing the dual function of both the rotor of the motor and the impeller of the fan;

an axially magnetized permanent magnet mounted internally of the impeller rotor structure, the impeller rotor being mounted in a cylindrical rotor mounting support and being driven by interaction between the stator and the axially magnetized permanent magnet;

a printed circuit board mounted on the stator, the printed circuit board being constructed of iron as a base material with an insulating layer thereon, the iron base material providing the dual function of both a component of strength for a mounting base and a magnetic yoke for the motor;

a printed circuit on the insulating layer of the circuit board having thereon the electronic control components of the motor;

stator windings mounted on the insulating layer of the circuit board;

an axial starting bearing for the rotor carried by the printed circuit board; and the iron base material and the permanent magnet defining substantially a planar air gap.

3. Portable fan according to claim 1 or 2, wherein the stator windings are formed by an oval coil, the motor shaft is located approximately in the center of the coil, and further comprising magnetically acting means provided for a specific starting position of the rotor.

4. Portable fan according to claim 1 or 2, wherein the starting bearing for the rotor is formed by a plastic bearing supporting the motor shaft with a track cap.

5. Portable fan according to claim 4, wherein openings are provided in the circuit board, and motor casing parts are provided with projections which can snap into the openings in the circuit board.

6. Portable fan according to claim 4, wherein openings are provided in the circuit board, and motor bearing parts are provided with projections which can snap into the openings provided in the circuit board.

7. Portable fan according to claim 1 or 2, wherein the rotor mounting support has a bearing tube and a support member for the bearing tube.

8. Portable fan according to claim 7, wherein the bearing tube is formed by a sintered part and is inserted in non-rotary manner in an opening of the printed circuit board and is additionally retained and centered by the supporting member constructed as a plastic moulding.

9. Portable fan according to claim 8, wherein the supporting member for the bearing tube at the same time centers and orients the coil.

10. Portable fan according to claim 7, wherein openings are provided in the circuit board, and motor casing parts are provided with projections which can snap into the openings in the circuit board.

11. Portable fan according to claim 5, wherein openings are provided in the circuit board, and motor bearing parts are provided with projections which can snap into the openings provided in the circuit board.

12. Portable fan according to claim 5, wherein the bearing tube is formed by a plastic moulding and is inserted in non-rotary manner in an opening of the printed circuit board and is additionally retained and centered by the supporting member also constructed as a plastic moulding.

13. Portable fan according to claim 1 or 2, wherein openings are provided in the circuit board and motor casing parts are provided with projections which can snap into the openings in the circuit board.

14. Portable fan according to claim 1 or 2, wherein the electronic components are combined in an integrated circuit.

15. Portable fan according to claim 1 or 2, wherein the coil comprises a bifilar winding.

16. Portable fan according to claim 1 or 2, wherein axially the overall height of the portable fan is less than 30 mm.

17. Portable fan according to claim 1 or 2, wherein the impeller can start in both rotation directions and has radially oriented blades, the air being sucked in axially and blown out radially.

18. Portable fan according to claim 1 or 2[, wherein the] *further comprising a casing having an* outer circumference [of the casing] *which* is profiled by depressions for fastening therein [the] *an* apparatus to be ventilated.

19. Portable fan according to claim 1 or 2, wherein openings are provided in the circuit board, and motor bearing parts are provided with projections which can snap into the openings provided in the circuit board.

* * * * *